United States Patent [19]

Asai et al.

[11] 4,261,530
[45] Apr. 14, 1981

[54] WEBBING LOCKING MECHANISM

[75] Inventors: Toshiaki Asai, Niwa; Susumu Usami; Yoshio Tsujiuchi, both of Nagoya, all of Japan

[73] Assignee: Kabushiki-Kaisha Tokai-Rika-Denki-Seisakusho, Aichi, Japan

[21] Appl. No.: 53,523

[22] Filed: Jun. 29, 1979

[30] Foreign Application Priority Data

Jul. 3, 1978 [JP] Japan .................. 53-91613[U]

[51] Int. Cl.³ .................. A62B 35/02; B65H 75/48
[52] U.S. Cl. .................. 242/107.4 R; 180/268; 242/107.6; 280/806; 297/478
[58] Field of Search .................. 242/107.4 R, 107.4 A, 242/107.4 B, 107.4 C, 107.4 D, 107.4 E, 107.6, 107.7, 107.2; 280/801–808; 180/268; 297/468, 469, 473–479, 480

[56] References Cited

U.S. PATENT DOCUMENTS

| 3,880,364 | 4/1975 | Andres | 242/107.4 R |
| 3,942,740 | 3/1976 | Torphammar et al. | 242/107.4 B |
| 3,957,223 | 5/1976 | Colasanti et al. | 242/107.6 |
| 4,059,242 | 11/1977 | Tanaka | 242/107.7 X |

FOREIGN PATENT DOCUMENTS 51-73417  9/1976  Japan .
52-130332 4/1977  Japan .

Primary Examiner—John M. Jillions
Attorney, Agent, or Firm—Stevens, Davis, Miller & Mosher

[57] ABSTRACT

Tension at the intermediate portion of a restraining webbing is detected by tension detecting means to sense the condition of a webbing fastened to an occupant, whereby the movement of the webbing is prevented when said webbing is fastened to the occupant, to thereby prevent the tension of the webbing from acting on the occupant during driving.

11 Claims, 4 Drawing Figures

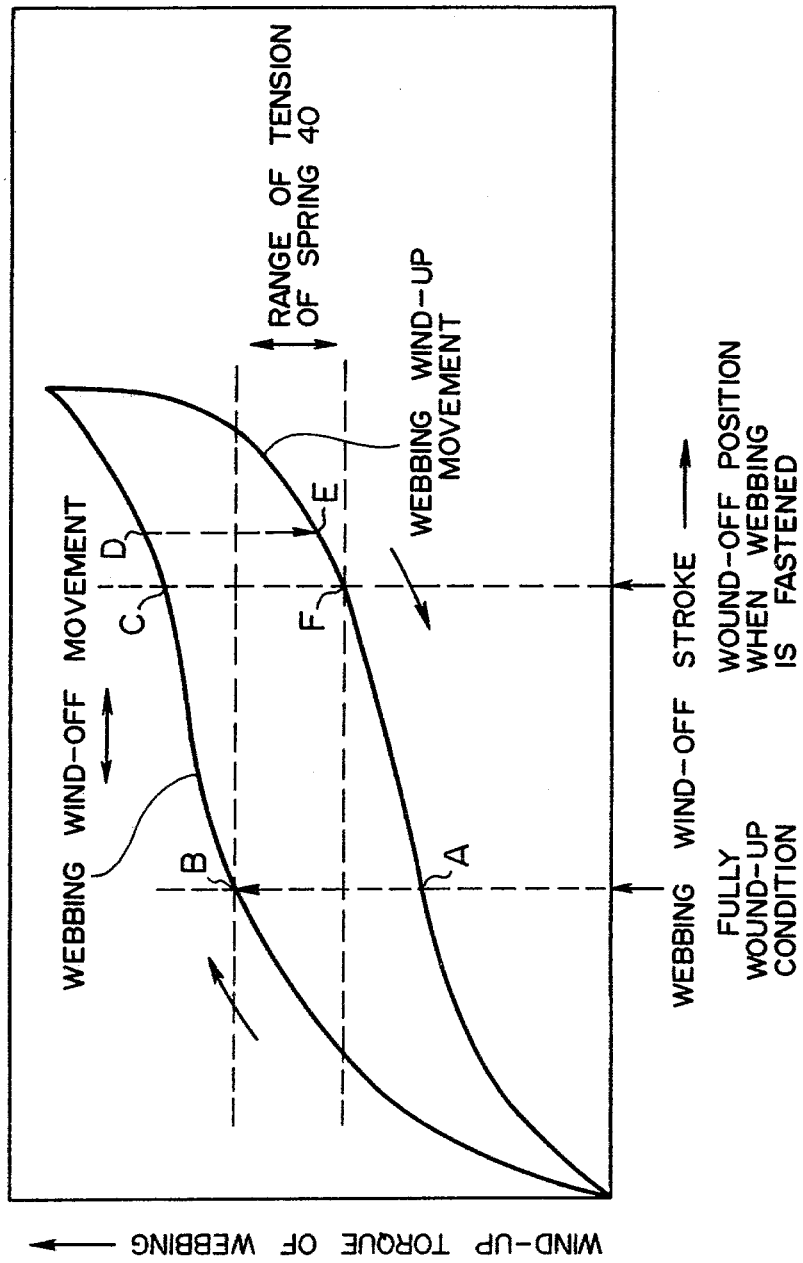

WEBBING LOCKING MECHANISM

BACKGROUND OF THE INVENTION

1. Field of the Invention

The present invention relates to a webbing locking mechanism for use in a seatbelt system for protecting an occupant in an emergency of a vehicle.

2. Description of the Prior Art

In general, a seatbelt system is constructed such that, while the webbing is fastened to the occupants, there is tension in the webbing from the seatbelt wind-up device. After the unfastening of the webbing, most of the webbing is wound up and retracted.

The wind-up biasing force by the wind-up device exerts an uncomfortable oppressive feeling on the occupant through the webbing, which results in a feeling of fatigue given to the occupant after a long period of driving and a decreased utilization rate of the seatbelt system.

There has been proposed a seatbelt wind-up device capable of giving comfortable driving to the occupant by exerting no wind-up biasing force on the occupant after the webbing is fastened to the occupant. Said seatbelt wind-up device is constructed such that a pawl is brought into mesh with a ratchet wheel fixed on a webbing-winding drum to prevent the wind-up and wind-off rotations of the winding drum, a solenoid to be actuated by a collision sensing switch and seatback switch is connected to said pawl, and the pawl is separated from the ratchet wheel to allow the winding drum to rotate when necessary.

More particularly, the normal driving posture of the occupant is detected by the seatback switch incorporated in the occupant's seat, and in this normal driving posture, the solenoid is made inoperative, whereby the pawl is engaged with the ratchet wheel to stop the rotation of the winding drum, thus preventing the biasing force from being exerted on the webbing. While, in an emergency of the vehicle, a collision sensing switch makes the solenoid inoperative, whereby the pawl is brought into meash with the ratchet wheel by the biasing force, thus preventing the rotation of the winding drum.

However, in the seatbelt system of the type described, the switch provided on the seatback of the occupant's seat is adapted to detect the normal driving posture of the occupant; hence, the wiring from said switch to the seatbelt wind-up device is very complicated and moreover, it is impossible to reliably detect the normal driving posture of the occupant. Namely, the occupant is not always pressing the upper half of his body against the seatback in the normal driving posture, in which case, the seatback switch is not closed, whereby the wind-up biasing force is still exerted on the occupant as the uncomfortable oppressive feeling.

SUMMARY OF THE INVENTION

One object of the present invention is to provide a webbing locking mechanism that detects any change in the normal driving posture of the occupant by monitoring the tension in the webbing, in such a mechanism the wiring can be simplified and the normal driving posture of the occupant can be reliably detected.

The webbing locking mechanism according to the present invention is of such an arrangement that tension of the intermediate portion of the webbing is detected by a tension detecting means to sense the condition of the webbing fastened to the occupant and the movement of the webbing is locked by locking means when the webbing is fastened to the occupant, thus the tension of the webbing does not act on the occupant.

Description will hereunder be given of one embodiment of the present invention with reference to the drawings.

BRIEF DESCRIPTION OF THE DRAWINGS

FIG. 3 is a chart showing the relationship between the wind-up tension of the webbing, the wind-off value of the webbing and the biasing force of the wind-off detecting lever;

DESCRIPTION OF THE PREFERRED EMBODIMENT

Figure 1:
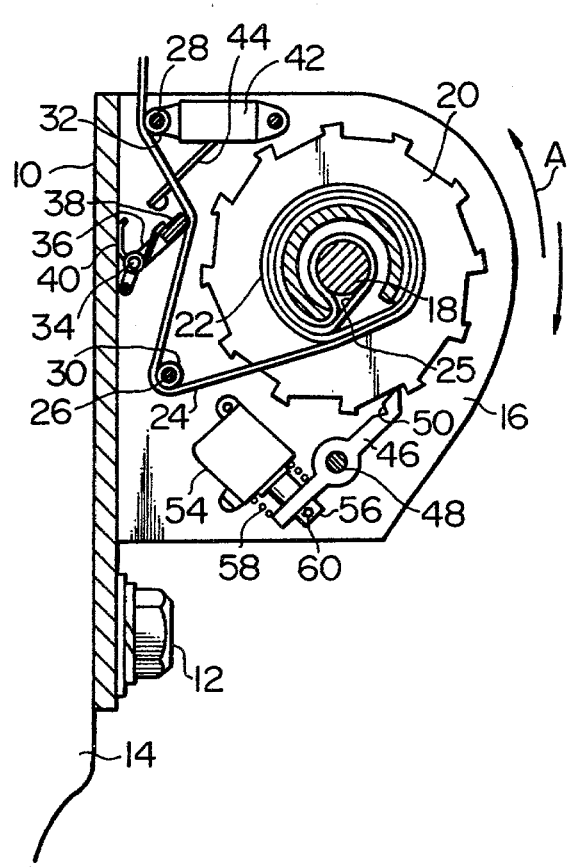
FIG. 1 is a cross-sectional view showing one embodiment of the webbing locking mechanism according to the present invention.

In FIG. 1, a frame 10 of a seatbelt wind-up device is formed of a thin metal plate, and fixed on the vehicle body 14 through mounting bolts 12.

A pair of legs 16 are extended in parallel with each other from said frame 10 (In FIG. 1, a leg at one side is omitted.), and a wind-up shaft 18 is pivotally supported by said legs 16. A pair of ratchet wheels 20 are fixed on said wind-up shaft 18 at a suitable interval (In FIG. 1, a ratchet wheel 20 at one side is omitted.), and fixed to said ratchet wheels 20 are opposite axial ends of a winding drum 22 being of letter 'C' shaped in cross section which is disposed around the wind-up shaft 18.

Wound up by said winding drum 22 is webbing 24 which restrains the occupant, one end of which is formed with a loop 25 which is inserted into the winding drum 22 through a cut-away portion thereof and wound around and engaged with the wind-up shaft 18. The other end of said webbing 24 not shown is the portion used for restraining the occupant. Further, a spiral spring (not shown) is interposed between said wind-up shaft 18 and the leg 16 and adapted to bias the winding drum 22 so as to wind up the webbing 24 (the direction indicated by an arrow A in FIG. 1). Consequently, to fasten the webbing 24 to himself, the occupant pulls the webbing against said biasing force, whereby the winding drum 22 is rotated in the direction of winding off the webbing 24 (the direction indicated by an arrow B in FIG. 1) to wind off the webbing.

Shafts 26, 28, which are racked across said pair of legs 16, pivotally support guide rollers 30, 32. The webbing 24 which has been wound off the winding drum 22 is passed over guide rollers 30, 32, and thereafter, reaches the portion which restrains the occupant.

The webbing 24 between said guide rollers 30, 32 is in contact with a detecting rod 38 of a wind-off detecting lever 36 pivotally supported by the leg 16 through a pivot 34. Said wind-off detecting lever 36 is swung in the clockwise direction in FIG. 1 by the biasing force of a torsional coil spring 40 interposed between said lever 36 and the frame 10, to thereby cause the webbing 24 between the guide rollers 30, 32 to be bent.

When the webbing 24 is fully wound up (point A, FIG. 3), as it is when there is no occupant, the biasing force of the torsional coil spring 40 is larger than the tension on the webbing 24. Thus, the webbing 24 between the guide rollers 30, 32 is bent to the maximal value. While, when the occupant has first started winding off the webbing 24 to the value to be wound off the winding drum 22 when the webbing is fastened to the occupant (at the point B in FIG. 3), the wind-off biasing force of the webbing 24 becomes laerger than the biasing force of the torsional coil spring 40, whereby the detecting lever 36 is swung in a counter-clockwise direction (FIG. 1), thus the webbing 24 between the guide rollers 30, 32 becomes almost straight. Furthermore, to fasten the webbing to himself, the occupant temporarily winds off more than the wind-off value when the webbing is fastened to the occupant (point D in FIG. 3). After the webbing is fastened to the occupant, the slight excess wind-off value is wound up, thus reducing the tension in the webbing 24, and the wind-off value when the webbing 24 is fastened to the occupant is restored on the curve of the webbing wind-up movement (line EF in FIG. 3). The biasing force of the torsional coil spring 40 becomes larger than the tension of the webbing 24, whereby the wind-off detecting lever 36 is swung to the maximal rotational value as shown in FIG. 1.

When the wind-off detecting lever 36 is swung in the counter-clockwise direction in FIG. 1 by the tensile force of the webbing 24, i.e., the occupant is fastening the webbing to himself, or, in the case the occupant changes his driving posture after he has fastened the webbing to himself, if he moves the upper half of his body, the rotation of lever 36 is detected by a wind-off detecting switch 42. A probe 44 projecting from said wind-off detecting switch 42 reaches the rear of the wind-off detecting lever 36. When said wind-off detecting lever 36 is swung in the counter-clockwise direction in FIG. 1, said probe 44 comes into contact therewith to detect the swing of the detecting lever 36.

Figure 2:
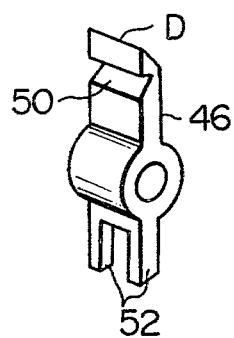
FIG. 2 is an oblique view showing the pawl.

The pawl 46 shown in FIGS. 1 and 2 is supported by a pivot 48 fixed on said leg 16. When said pawl 46 is engaged with the ratchet wheel 20 as shown in FIG. 1, the rotation of the ratchet wheel 20, i.e., the wind-off and wind-up rotations of the winding drum 22 is prevented.

Figure 4A:
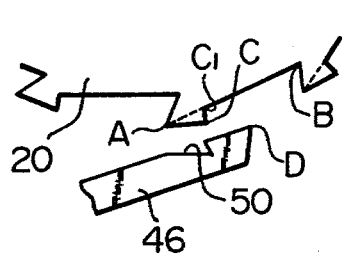
FIGS. 4A through 4C are partially enlarged views illustrating the conditions of the pawl and ratchet wheel being in mesh with each other.
Figure 4B:
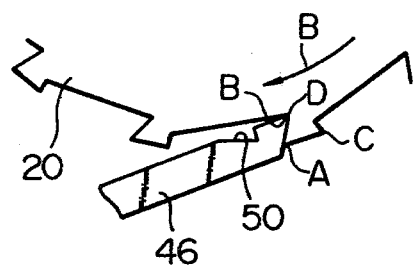
Figure 4C:
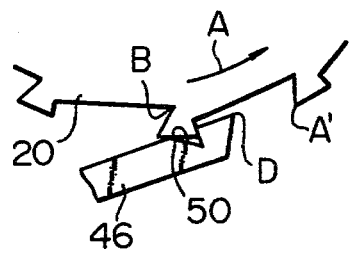

As shown in FIGS. 4A through 4C, the profile of tooth top ratchet wheel 20 is a conventional saw-toothed ratchet contour in which a point A, the tooth top, point B, the tooth root, and point $C_1$, are on a straight line, a ratchet surface having a small tooth facing in the saw tooth profile of the ratchet wheel 20 opposite to the direction is integrally formed on said straight line (A, C, B) by connecting point A, the tooth top, point C which is at substantially the same radius as point A, and a point $C_1$ at the intermediate point between said points A and B. Pawl 46 is notched with a cutout 50 at a position slightly rearwardly of a point D, which is the front of the pawl 46. The shape of cutout 50 must be such that the teeth formed by connecting points A, C, and $C_1$ can be engaged by notch 50. Thus, as shown in FIG. 4A, pawl 46, when it is separated from the ratchet wheel 20, makes the ratchet wheel 20 rotatable but, when it is in mesh with the ratchet wheel 20, prevents both the wind-off and wind-up rotations of the ratchet wheel 20. More particularly, as shown in FIG. 4B, when the ratchet wheel 20 is rotated in the wind-off direction of the webbing, a point D of tooth top of the pawl 46 comes into mesh with point B of tooth root of the ratchet wheel to prevent the wind-off rotation of the ratchet wheel, and, when the ratchet wheel 20 is rotated in the wind-up rotation, the cutout 50 comes into mesh with a point C of tooth top of ratchet wheel 20, as shown in FIG. 4C, to prevent the rotation of the ratchet wheel 20.

As shown in FIG. 2, the end opposite point D on pawl 46 is formed into a bifurcated arm 52, through which a plunger 56 of a solenoid 54 extends. A compression spring 58 is confined between said solenoid 54 and the bifurcated arm 52 to rotate the pawl 46 in the counter-clockwise direction in FIG. 1, thus biasing the point D the tooth top into engaging ratchet wheel 20.

Furthermore, a pin 60 penetrates through said plunger 56, engages the bifurcated arm 52 of the pawl 46 and, when the solenoid 54 is actuated to retract the plunger 56 into the solenoid 54 through the exciting force, moves the bifurcated arm 52 against the biasing force of the compression spring 58 to separate the point D of the tooth top of the pawl 46 from the ratchet wheel 20.

Figure 5:
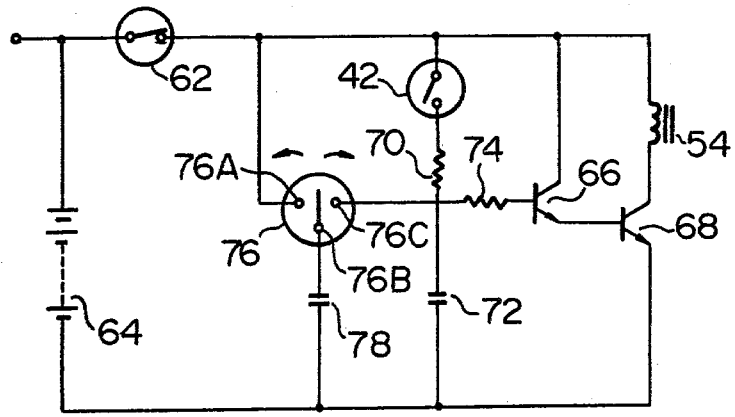
FIG. 5 is a circuit diagram used in the present embodiment.

As shown in FIG. 5, the solenoid 54 is connected at one end to a plus terminal of a power source 64 of the vehicle through a normally closed acceleration sensor 62 and at the other end to a minus terminal of the power source 64 of the vehicle through a collector terminal and an emitter terminal of a latter stage transistor of a two transistor Darlington circuit.

In addition, the wind-off detecting switch 42 mounted on the frame 10 is connected at one end to a plus terminal of the power source 64 of the vehicle through the acceleration sensor 62 and at the other end to a minus terminal of the power source 64 of the vehicle through a resistance 70 (22 KΩ) and a capacitor 72 (33μ). The intermediate connecting portion between said resistance 70 and the capacitor 72 is connected to the base terminal of the transistor 66 through a resistance 74 (100 KΩ) to apply thereto a terminal voltage of capacitor 72.

Furthermore, a fixed contact 76A of a buckle switch 76 on the side of fastening the webbing to the occupant is connected to the intermediate connecting portion between the acceleration sensor 62 and the wind-off detecting switch 42 in said circuit, a movable contact 76B of said buckle switch 76 is connected to a minus terminal of the power source 64 of the vehicle through a capacitor 78 (33μ), and a fixed contact 76C at the side of unfastening the webbing to the occupant is connected to the resistance 74 to apply the terminal voltage of the capacitor to the base terminal of the transistor 66. In said buckle switch 76, when the occupant inserts the tongue plate (not shown) mounted at the end of the webbing 24 into the buckle (not shown) to fasten the webbing to himself, the contacts 76A and 76B are closed. On the contrary, when the occupant withdraws the tongue plate from the buckle to unfasten the webbing from himself, the contacts 76B and 76C are closed.

Description will hereunder be given of action of the present embodiment with the above described arrangement. In the beginning stage where the occupant fastens the webbing 24 to himself, after getting into the vehicle, the wind-up, tension force in the webbing is larger than the biasing force of the torsional coil spring 40 of the wind-off detecting lever 36 as shown in FIG. 3. The tension in the webbing 24 rotates the windoff detecting lever 36 in a counter clockwise direction. The wind-off detecting lever 36 actuates the wind-off detecting switch 42. As the result, the capacitor 72, having completed the charge in a predetermined period of time (in about 50 msec), applies the terminal voltage to the base terminal of the transistor 66, whereby the transistor 68 feeds the current from the power source of the vehicle to the solenoid 54. The resultant exciting force causes the plunger 56 to rotate the pawl 46 against the biasing force of the compression coil spring 58, whereby the pawl 46 is separated from the ratchet wheel 20 as shown in FIG. 4A. Consequently, the occupant can wind the webbing off the wind-up shaft 18 to fasten the webbing to himself.

When the occupant fastens the webbing to himself, the tongue plate at the end of the webbing is engaged with the buckle (not shown), which closes contact 76A and 76B of buckle switch 76, thus charging capacitor 78. After the occupant has fastened the webbing to himself, the webbing 24, still somewhat wound up, stops at the wind-off position (point C, FIG. 3), whereby the wind-off switch 42 is opened. During this time, the capacitor 72 is discharged, whereby the transistors 66 and 68 temporarily hold the solenoid 54 in the energized condition (for about two minutes), during which time the webbing becomes movable. Thereafter, the solenoid 54 is deenergized, which causes pawl 46 to come into mesh with the ratchet wheel 20.

When the pawl 46 is meshed, the ratchet wheel 20, which is biased and torqued in the wind-up direction by the wind-up biasing force of the spiral spring (not shown) interposed between the wind-up shaft 18 and the leg 16, rotates by one tooth (A, FIG. 4A) in the wind-up direction, whereby the point C of tooth top of the ratchet wheel 20 comes into mesh with the cutout 50 of the pawl 46, thus preventing the wind-up rotation of the ratchet wheel 20. As the result, the tensile force of the webbing 24 is interrupted, whereby no wind-up biasing force is exerted on the occupant, so that the occupant can obtain the comfortable driving condition.

Next, in the case the occupant moves his upper half body by actions such as changing the driving posture, the tensile force of the webbing 24 is increased again to an extent close to the maximal wind-off torque (close to the point D, FIG. 3) whereby the detecting rod 38 closes the detecting switch 42 to cause the solenoid 54 to attract the plunger 56. As the result, the pawl 46 is separated from the ratchet wheel again to allow the winding drum to rotate, so that the occupant can move freely. Furthermore, in the case the occupant is restored to the initial driving posture again, the tensile force of the webbing is decreased, whereby the solenoid 54 becomes inoperative in a predetermined period of time, thus returning the pawl 46 and ratchet wheel 20 to the positions shown in FIG. 4C.

Next, in case where the vehicle is involved in an emergency such as a collision, the occupant is violently thrown into the direction of collision, whereby a great tensile force is exerted on the webbing 24. However, in the normal running condition of the vehicle, the pawl 46 is in mesh with the ratchet wheel 20. Hence, when the ratchet wheel 20 is rotated only by one pitch at the maximum, the point B of tooth root of the ratchet wheel 20 comes into mesh with the point D of tooth top of the pawl 46, thereby preventing the rotation. Consequently, the tensile force of the webbing 24 is reliably held, thus securing the safety of the occupant.

Furthermore, in case the vehicle collides while the occupant is changing his driving posture, the pawl 46 is separated from the ratchet wheel 20, but, the collision sensor 62 is opened, whereby the solenoid 54 is deenergized to cause the pawl 46 to come into mesh with the ratchet wheel 20, so that the occupant is restrained.

Next, in the case the occupant gets in or out of the vehicle, the contacts 76B and 76C of the buckle switch are closed, whereby the capacitor 78 is discharged to temporarily (for about 2.5 sec) energize the solenoid, so that the wind-up shaft 18 can be rotated, thereby enabling the webbing 24 to be fully wound up.

In addition, since increase in tensile force of the webbing 24 is detected between the rollers 30 and 32 during each action described above, the condition of the webbing 24 being wound off can be detected before the rotation of the winding drum 22 is started, whereby each action described above can be secured and the condition of the webbing 24 being wound off can be reliably detected no matter how the webbing 24 is fastened to the occupant.

Additionally, the present system is provided therein with a delay circuit as shown in FIG. 5, so that the period of time for energizing the solenoid 54 can be made longer than the period of time for closing the wind-off detecting switch 42, thus enabling the further securing of each action described above.

While the invention has been described as in the embodiment in which the pawl 46 is provided with a cutout 50 and the ratchet wheel 20 is provided with tooth tops in the reverse direction so that the wind-off and wind-up rotations of the ratchet wheel 20 can be prevented by a single pawl 46, it is needless to say that the invention is not limited to the specific embodiment and that such systems can be applicable in which the ratchet wheel and pawl having tooth tops in the reverse direction, respectively, are separately provided, or, a plurality of solenoids are provided.

As has been described, in the webbing locking mechanism according to the present invention, a wind-off detecting switch is provided for detecting the tensile force of the webbing which has been wound off the winding drum. Hence, an excellent advantages is obtained over prior seatbelt systems, since the wiring between said wind-off detecting switch and the solenoid can be extremely simplified, and further, the condition of the webbing being wound off by the occupant can be reliably monitored, so as to correct for any increase in tension in the webbing resulting from changes in the driving posture of the occupant and to thereby obviate the uncomfortable oppressive feeling to the occupant by reducing the tension in the webbing.

What is claimed is:

1. A webbing locking mechanism, wherein tension of a webbing exerted on an occupant is decreased after the webbing is fastened to the occupant, comprising:
   a webbing for restraining and protecting the occupant in an emergency of a vehicle;
   means for biasing and deflecting an intermediate portion of the webbing with a biasing force of a predetermined value;
   tension detecting means for detecting the tension of the webbing through detecting a value of deflection when the intermediate portion of the webbing is deflected by said biasing force of said predetermined value; and
   locking means actuated by a detecting signal fed from said tension detecting means for preventing the movement of the webbing in the longitudinal direction when the tension at the intermediate portion of the webbing is less than a predetermined value.

2. A webbing locking mechanism as set forth in claim 1, wherein said tension detecting means is provided with a tension detecting lever for deflecting the webbing by being biased by a spring.

3. A webbing locking mechanism as set forth in claim 2, wherein said tension detecting lever comes into abutting contact with a probe of a wind-off detecting switch to actuate said wind-off detecting switch when said tension detecting lever is swung against the biasing force of said spring.

4. A webbing locking mechanism as set forth in claim 3, wherein the intermediate portion where tension of said webbing is detected is passed over a pair of guide rollers.

5. A webbing locking mechanism as set forth in claim 1, wherein one end of said webbing is wound up onto a winding drum pivotally supported on a frame and a biasing force is applied to the winding drum.

6. A webbing locking mechanism as set forth in claim 5, wherein said tension detecting means and said locking means are mounted on said frame.

7. A webbing locking mechanism as set forth in claim 6, wherein said locking means comprises ratchet wheels fixed on said winding drum and pawls come into mesh with said ratchet wheels to prevent the ratchet wheels and winding drum from rotating.

8. A webbing locking mechanism as set forth in claim 7, wherein said pawls are separated from the ratchet wheels by a biasing force of a solenoid excited through the actuation of said tension detecting means and said pawls are brought into contact with the ratchet wheel by a spring.

9. A webbing locking mechanism as set forth in claim 8, wherein said ratchet wheels are provided thereon with teeth which when engaged with teeth of said pawl prevent the webbing wind-off and wind-up rotations of the ratchet wheels.

10. A webbing locking mechanism as set forth in claim 9, wherein said teeth of the pawl are constituted by the forward end portion thereof and a cutout provided at the intermediate portion thereof.

11. A webbing locking mechanism comprising: a frame mounted on the vehicle body; a winding drum pivotally supported on said frame for winding up one end portion of a webbing for restraining an occupant by a biasing force; a wind-off detecting lever being biased in the direction to deflect the intermediate portion of the webbing wound off a winding drum so as to detect tension of the webbing; a wind-off detecting switch adapted to be opened or closed by said wind-off detecting lever; and locking means being actuated by said wind-off detecting switch to prevent the webbing wind-off rotation of the winding drum to thereby prevent said wind-up biasing force from acting on the occupant when the webbing is fastened to the occupant; whereby tension of the webbing is detected when the webbing is fastened to an occupant, so that the webbing wind-off rotation of the winding drum can be locked.

* * * * *